United States Patent
Kim

(10) Patent No.: US 6,330,449 B1
(45) Date of Patent: Dec. 11, 2001

(54) SOFT HANDOFF METHOD IN A CELLULAR MOBILE COMMUNICATION SYSTEM

(75) Inventor: Wan-ho Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/311,927

(22) Filed: May 14, 1999

(30) Foreign Application Priority Data

May 29, 1998 (KR) .................................................. 98-19739

(51) Int. Cl.[7] ...................................................... H04Q 7/20
(52) U.S. Cl. ........................ 455/442; 455/436; 455/439; 370/331
(58) Field of Search .................................. 455/436, 437, 455/438, 439, 442; 370/331

(56) References Cited

U.S. PATENT DOCUMENTS 5,884,175 * 3/1999 Schiefer et al. .................... 455/436
5,946,621 * 8/1999 Chheda et al. ..................... 455/442
5,987,013 * 11/1999 Kabasawa ........................... 455/442
6,049,716 * 4/2000 Jung ................................... 455/442

* cited by examiner

*Primary Examiner*—Lee Nguyen
*Assistant Examiner*—Simon Nguyen
(74) *Attorney, Agent, or Firm*—Dilworth & Barrese, LLP

(57) ABSTRACT

It is an object of the present invention to provide a method to prevent soft handoff failures due to a faulty reverse wireless link. In general, when a BSC does not receive a handoff completion message from a mobile station, the BSC commands the mobile station to report the change of the active set a second time. The second report is then compared to a previous report to determine whether there is any change of the active set. In the case there is no change in the active set, the BSC commands the mobile station to perform the handoff. This method is efficient in that the entire soft handoff process need not be repeated in its entirety.

3 Claims, 5 Drawing Sheets

SOFT HANDOFF METHOD IN A CELLULAR MOBILE COMMUNICATION SYSTEM

BACKGROUND OF THE INVENTION

1. Field of the Invention

The present invention relates generally to cellular communication systems. More particularly, the present invention relates to a recovery method to facilitate the completion of a soft handoff when a reverse link is faulty.

2. Description of the Related Art

FIG. 1 shows a schematic diagram of a conventional CDMA mobile communication system. As shown, the conventional system comprises: the base transceiver stations (BTSs) (30, 31) which provide the mobile communication services with the mobile stations 40, 41; the BSCs (Base Station Controller) 20, 21 which control BTSs 30, 31; the MSC (Mobile Switching Center) 10 which connects a plurality of the BSCs 20, 21 with the PSTN (Public Switched Telephone Network) 11.

The forward link is directed from the BTS to the mobile station, and the reverse link is directed from the mobile station to the BTS in the above CDMA system. All forward channels in each BTS share an identical PN (Pseudo random Noise) sequence offset. Therefore, the PN offset is an identification signal which distinguishes one BTS from another.

When a mobile station exits a present service region and enters a new region, the call is maintained by the handoff function in the cellular system. The CDMA mobile communication system provides various handoffs to guarantee the call continuity. The method for connecting a plurality of call paths without the need to switch frequencies by establishing a communication path with a new base station prior to terminating a communication path with an existing base station is called a soft handoff. U.S. Pat. No. 5,722,074 "Soft handoff in a cellular telecommunication system" discloses a soft handoff method in which the mobile station can communicate the wireless signals with at least 2 BTSs.

The system which supports the soft handoff manages a plurality of cells (or sectors), as an active set for connecting the mobile station to the channel. The mobile station changes the active set only by command of the BSC. That is, a new cell (or a sector) with a gradually increasing PN offset signal level is added to the active set, and the existing cell (or sector) with a gradually decreasing PN offset signal is removed from the active set.

FIG. 2 shows a conventional soft handoff process. When receiving a new PN offset signal, the mobile station 40 reports the change to the active set to the BSC 20 through the BTS (step 110). The BSC 20 determines if handoff is performed or not and the kinds of handoff (step 120) and commands the channel element of the BTS 30 to transmit a new wireless resource (step 130).

When the BSC 20 instructs the mobile station 40 to perform the handoff (step 140), the mobile station 40 changes the active set by performing the handoff, and reports the handoff completion to the BSC 20 through the BTS 30.

As previously stated, the handoff process initiated from the mobile station 40 is performed by command of the BSC 20.

In performing the handoff in the manner described above, when the quality of the 20 forward wireless link or the reverse wireless link is degraded because of the influences of the geographical features, artifacts, building, and climate, messages relating to the handoff may be lost. Further, the quality of the reverse link is equally likely to be degraded. When the HCM (Handoff Completion Message) of the mobile station 40 is lost (step 150) because of the poor quality of the reverse link, the BTS doesn't know whether handoff is completed or not, so it may occur that the handoff is not correctly performed afterwards. As a result, a discontinuity phenomenon of the call occurs because the mobile station is not controlled for proper handoff according to its direction of motion.

SUMMARY OF THE INVENTION

It is an object of the present invention to provide a method to prevent soft handoff failures due to a faulty reverse wireless link. In general, when a BSC does not receive a handoff completion message from a mobile station, the BSC commands the mobile station to report the change of the active set a second time. The second report is then compared to a previous report to determine whether there is any change of the active set. In the case there is no change in the active set, the BSC commands the mobile station to perform the handoff. This method is efficient in that the entire soft handoff process need not be repeated in its entirety in the event of a fault on the reverse link.

The method of the present invention is performed in a cellular mobile communication system including mobile stations which receive mobile communication services and manage active sets consisting of a plurality of received identification signals; identifying each service area a plurality of BTSs (Base Transceiver Stations) providing mobile communication services to the mobile stations moving between a plurality of service areas each a BSC (B3ase Station Controller) to connect the plurality of BTSs with the MSC (Mobile Switching Center) and to provide the mobile stations with the handoff.

When the mobile stations receive commands to perform handoff, handoff may fail because the BTSs have not received an acknowledgement signal due to a faulty reverse link. In this case, the method comprises the steps of: the BSC ordering the plurality of mobile stations to report a second time the change of pilot signal of each sector to the BSC; checking whether the contents of said second report is the same as a first report of the pilot signal, and if so, the BSC ordering the mobile stations to change the active set; and the mobile stations reporting to the BTS that said pilot signal change has been completed thereby completing the handoff.

In another aspect of the invention, the method comprises the steps of: the mobile station reporting said change of pilot signal of each cell to the BSC; determining by the BSC based on said report whether handoff is to be performed or not and which kind of handoff is to be performed; if handoff is to be performed according to said determination, the BSC orders the channel element of BTS to assign a new sector of a new cell according to said determined handoff; the BTS ordering the mobile stations by BTS to change the active set according to said transmitting order; if the mobile stations report the BSC the completion of said change of the active set in a predetermined time, BTS terminates handoff, or else BSC orders the mobile stations to report the change of the pilot signal of each cell; reporting BSC by the mobile stations said change of the pilot signal of each cell; checking whether said change is the same with those of the previous pilot signal; if not the same, determining by BSC whether handoff is to be performed or not and which kind of handoff is to be performed and ordering the release of the resources which began to transmit according to the previous handoff and transmitting the newly allocated resources; if the same or said transmitting order exists, ordering the mobile stations by BTS to change the active set; and reporting BTS by the mobile stations the completion of said change.

DETAILED DESCRIPTION OF THE PREFERRED EMBODIMENTS

Figure 3:
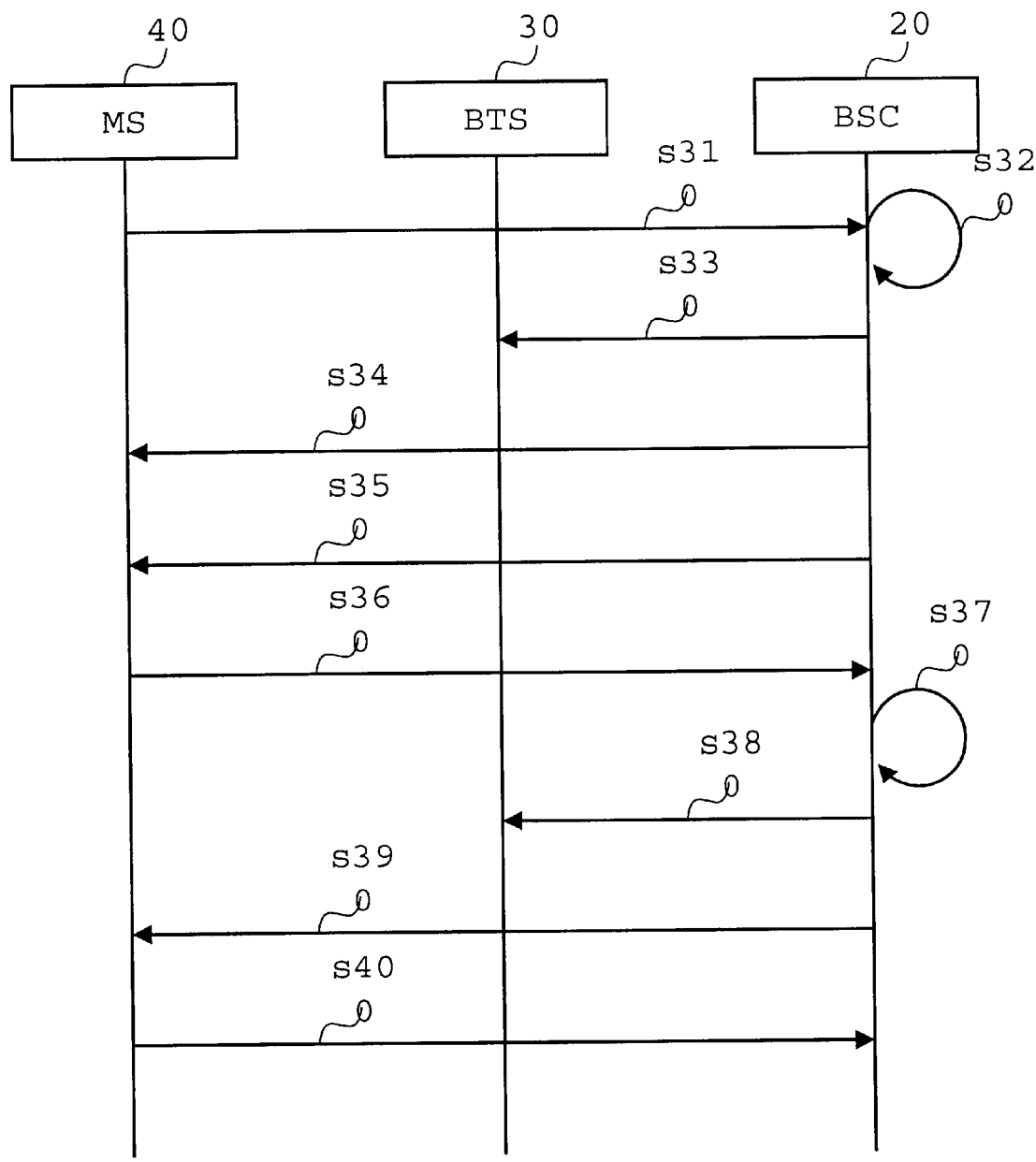
FIG. 3 illustrates a message flow of the present invention.
Figure 4:
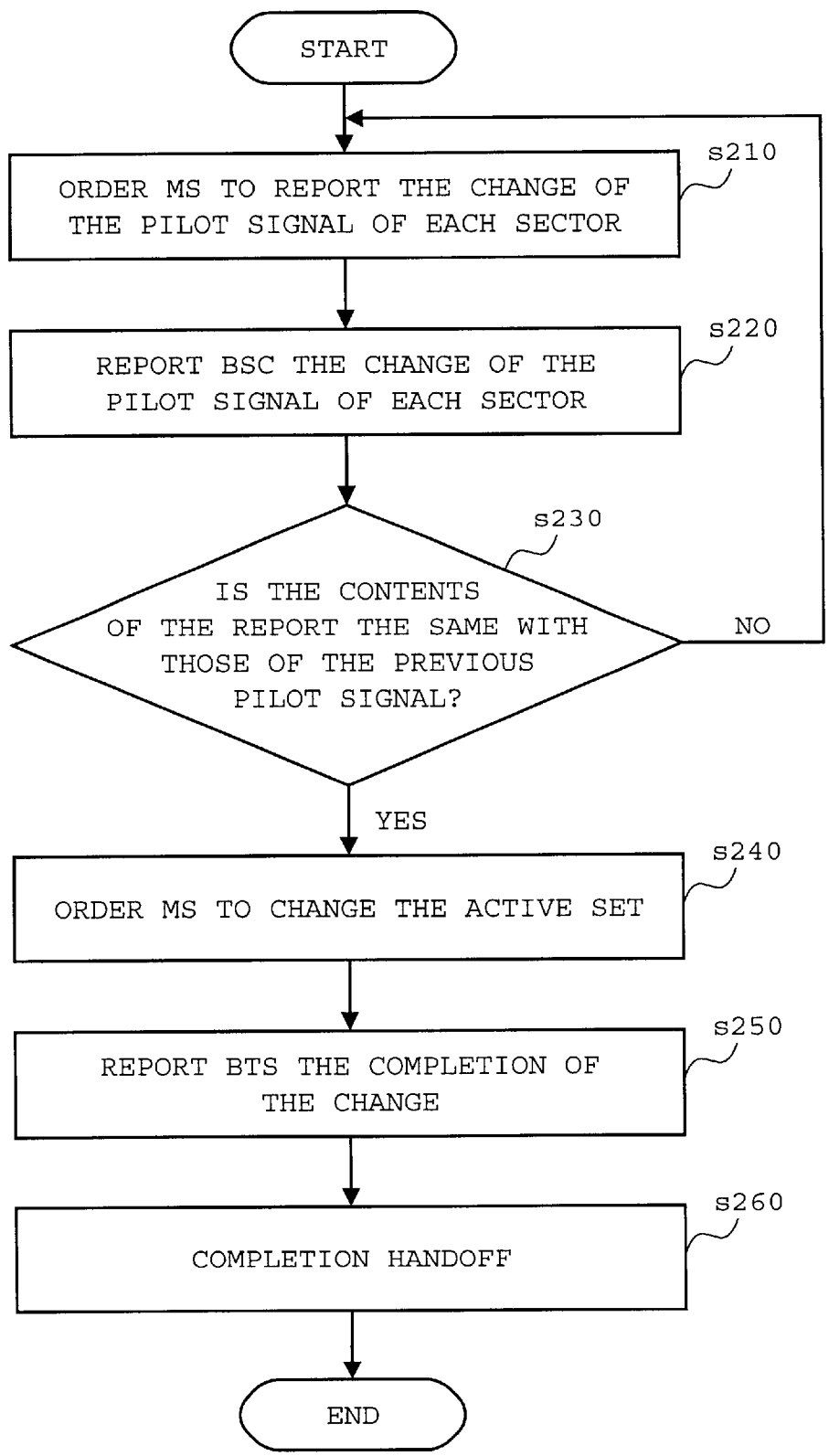
FIG. 4 illustrates a flow chart of a first preferred embodiment of the present invention.
Figure 5:
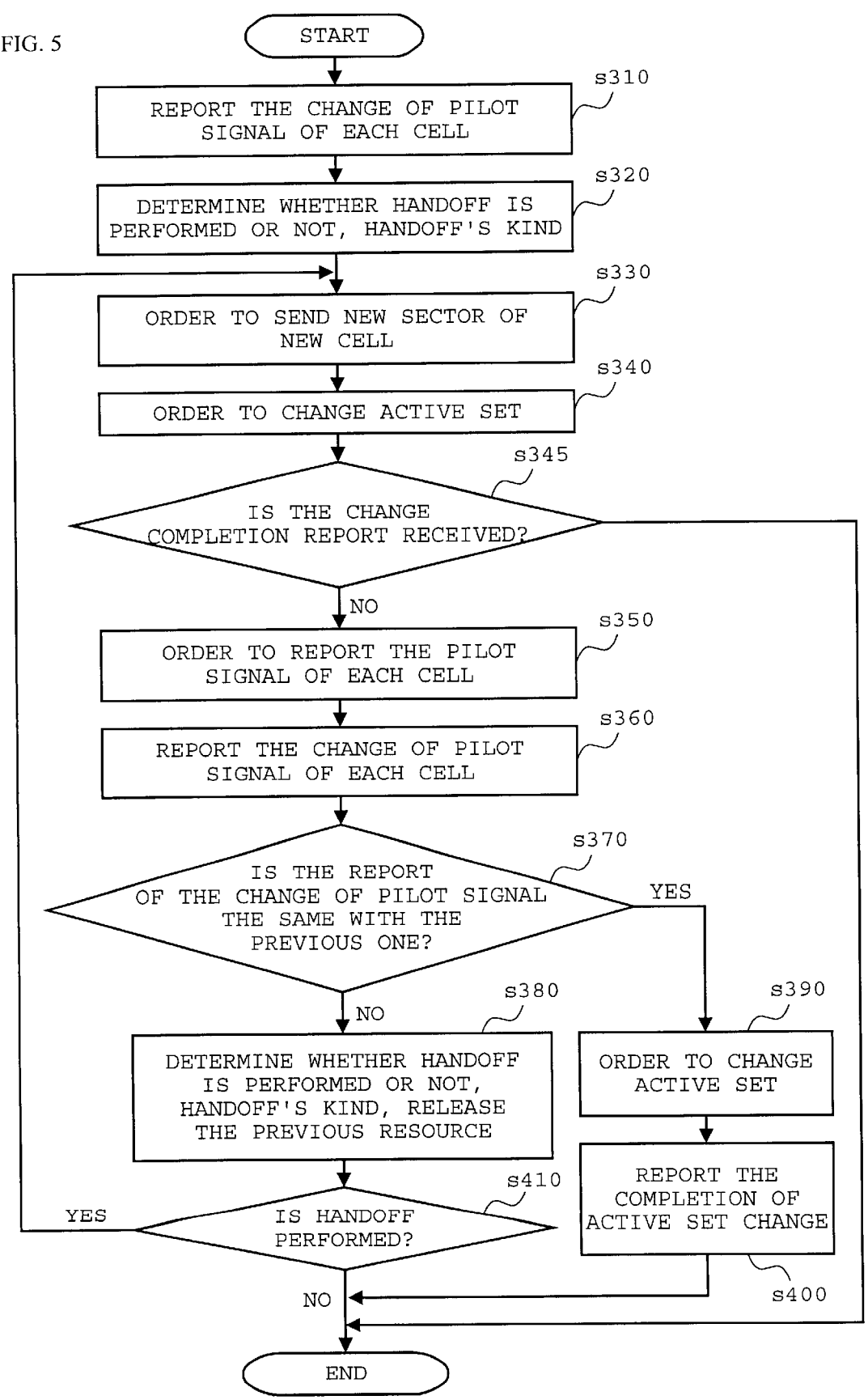
FIG. 5 illustrates a flow chart of a second preferred embodiment of the present invention.

Referring to FIGS. 3, 4 and 5, FIG. 3 illustrates a message flow of the present invention, FIG. 4 illustrates a flow chart of a first preferred embodiment of the present invention, and FIG. 5 illustrates a flow chart of a second preferred embodiment of the present invention.

Figure 1:
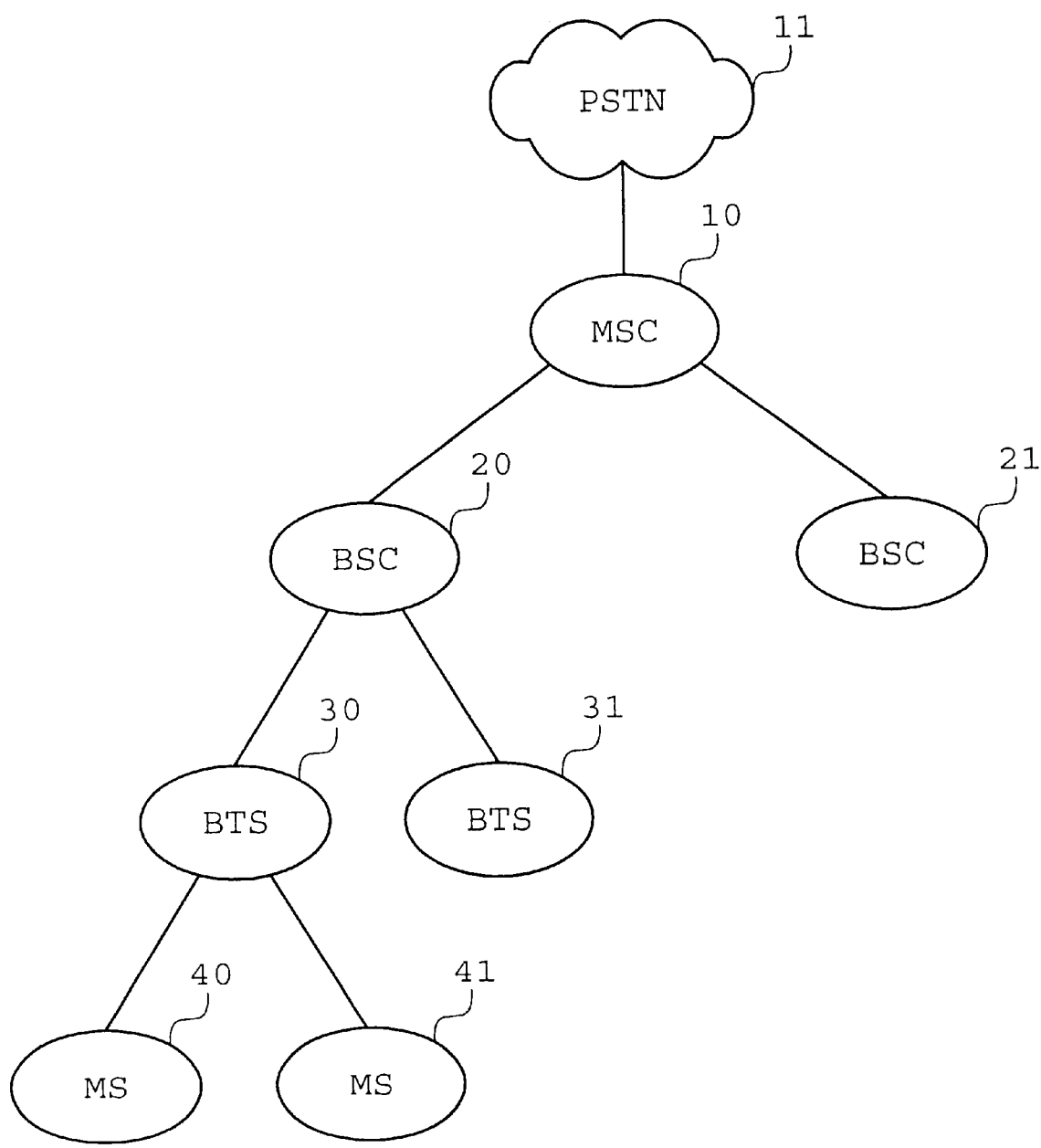
FIG. 1 illustrates a schematic diagram for a conventional CDMA mobile communication system.
Figure 2:
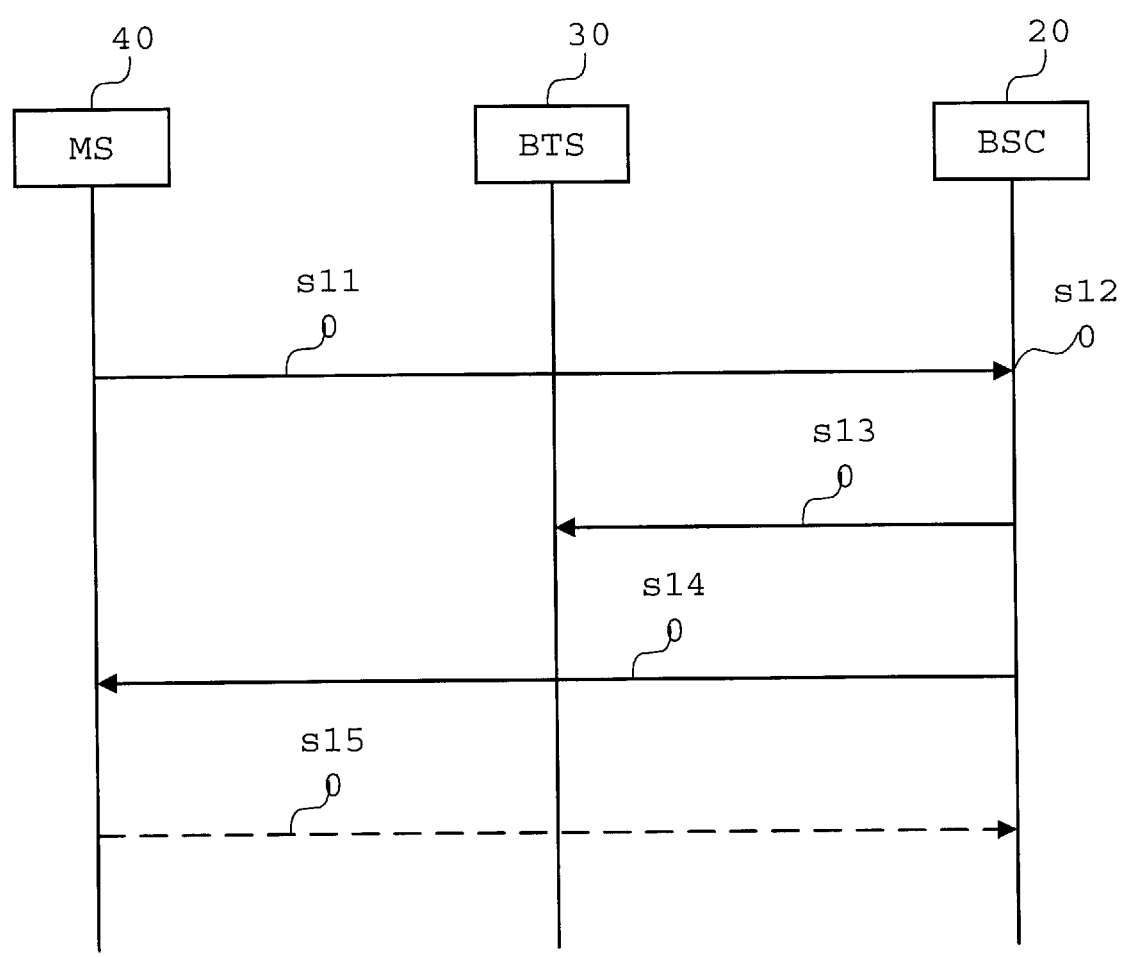
FIG. 2 illustrates a message flow chart of the conventional soft handoff procedure.

In a code division multiple access cellular mobile communication system as shown in FIG. 1, the system includes mobile stations 40 which receive the mobile communication services and manage active sets consisting of all the received identification signals, a plurality of BTSs (Base Transceiver Stations) 30 to provide the mobile stations 40 moving between a plurality of service areas with mobile communication services, the service areas having inherent ID signals, and a BSC (Base Station Controller) 20 connecting a plurality of BTSs 30 with the MSC (Mobile Switching Center) 10 and for providing the mobile stations 40 with the handoff. In the case where the mobile stations 40 have received commands to perform handoff, handoff may fail because the BTSs 30 may not receive the acknowledgement signal.

First Embodiment

Referring to FIG. 4, a flow chart illustrating the method steps of a preferred embodiment of the method of the present invention is shown, comprising the steps of: the BSC 20 ordering the plurality of mobile stations 40 to report the change of pilot signal of each sector (step 210); each mobile station reporting said change of pilot signal of each sector to the BSC 20 (step 220); checking by the BSC whether the contents of said second report B is identical with a previous report A (step 230), and if so, the BSC 20 ordering the particular mobile stations 40 to change the active set (step 240) because the resource corresponding to report B is allocated and being transmitted; and the mobile stations 40 reporting to the BTS 20 the completion of said change (step 250) and completing the handoff (step 260). If the contents of said reporting is determined not to be the same with those of the previous pilot signal (step 230), the method is terminated. The failure of the handoff may arise from a faulty reverse wireless link.

Second Embodiment

Referring to FIG. 5, a flow chart illustrating the method steps of a second embodiment of the present invention comprises the steps of: each mobile station 40 reporting said change of the pilot signal of each cell to the BSC 20 (step 310); the BSC 20 determines, based on said report, whether handoff is to be performed or not and which kind of handoff is to be performed (step 320); if handoff is to be performed according to said determination, the BSC 20 orders the channel element of BTS to assign a new sector of a new cell and report the information of the new sector according to said determined handoff (step 330); the BTS 30 ordering the mobile stations 40 to change the active set according to said BSC order to transmit a new cell (step 340); if the mobile stations 40 report that the BSC 20 completed said change of the active set in a predetermined time, the BTS 30 terminates handoff, otherwise the BSC 20 orders the mobile stations 40 to report the change of the pilot signal of each cell again (step 350); the mobile stations reporting to the BSC 20 said change of the pilot signal of each cell (step 360); checking whether said change is the same with those of the previous pilot signal (step 370); if not the same, determining by the BSC 20 whether handoff is to be performed or not and which kind of handoff is to be performed and; ordering the release of the resources which began to transmit according to the previous handoff and transmitting the newly allocated resources (step 380); if the same or said transmitting order exists, ordering the mobile stations by BTS 30 to change the active set (step 380); and reporting BTS 30 by the mobile stations 40 the completion of said change (step 390).

The method of the present invention is directed to preventing soft handoff failures due to a faulty reverse wireless link. In the method, when the BSC 20 doesn't receive the handoff completion message from the mobile stations 40, the BSC 20 commands the mobile stations 40 to report the change of the active set again.

The mobile station 40 observes a new PN offset, and reports the changes of the active set to the BSC 20 through the BTS 30 (step 310). The BSC 20 determines whether to perform the soft handoff or the softer handoff according to the sort of the PN offset newly observed by the mobile station 40 (step 320). The BSC 20 commands the BTS 30 to change the wireless resource according to the determined sort of the handoff (step 330). And, when the BSC commands the mobile station 40 to perform the handoff, the mobile station 40 changes the active set through the handoff process (step 340) and reports the handoff completion to the BSC 20 (step 350).

In this case, when the HCM of the mobile station 40 is lost because of the bad quality of the reverse wireless link, the BSC 20 fails to receive the HCM of the mobile station (step 345) and the BSC 20 commands the mobile station 40 to report again the changes of the active set (step 350).

The mobile station 40 measures the current observed PN offsets, and reports again the current active set to the BSC 20 (step 360). The BSC 20 compares the contents of the re-received active set with the contents of the first received active set (step 370), and in case there is no change in the active set, the BSC 20 commands the mobile station 40 to perform the handoff (step 390). The mobile station 40 performs the handoff and changes the active set by command of the BSC 20, and reports the handoff completion to the BSC 20 (step 400).

As stated above, when the HCM transmitted from the mobile station 40 is lost, the handoff process is performed not by initializing the whole process of the handoff, but by utilizing the existing history.

But, when the active set which the mobile station 40 again reported is changed (step 370), that is, when the mobile station 40 moves, the BSC 20 must perform another handoff which is different from the previous case. That is, when there is a change of the active set, the BSC 20 determines the kind of new handoff and whether the new handoff has to be performed or not. And the BSC 20 commands the BTS 30 to recover the resource which was allocated previously and to allocate the new resource (step 380).

If handoff is not performed, the handoff procedure terminates and otherwise, return to step 330(step 410).

As stated above, the present invention discloses a method to complete a soft handoff without performing the steps of the process handoff again from the beginning, when the handoff completion message is lost because of the faulty reverse link.

The present invention advantageously guarantees the continuity of the call by performing the handoff continuously without initializing the messages of the conventional handoff procedure, when the handoff fails because of the bad reverse wireless link or the forward wireless link according to the surrounding circumstances.

What is claimed is:

1. In a code division multiple access cellular mobile communication system, said system including a plurality of mobile stations which receive mobile communication services and manage active sets consisting of received identification signals identifying service areas, a plurality of BTSs (Base Transceiver Stations) for providing the mobile stations moving between a plurality of service areas with said mobile communication services, a BSC (Base Station Controller) connecting said plurality of BTSs with an MSC (Mobile Switching Center) and for providing the mobile stations with a handoff, a soft handoff method for completing a soft handoff when said soft handoff fails because the BSC does not receive an acknowledgement signal comprising the steps of:

(i) ordering the plurality of mobile stations by the BSC to report the change of the pilot signal of each sector;

(ii) reporting said change of pilot signal of each sector to the BSC by the mobile station responsive to said ordering step;

(iii) checking whether the contents of said second report is identical with a first report included in a previous pilot signal, and if said first and second report are identical, ordering the mobile stations by the BSC to change the active set to correspond with said second report; and (iv) reporting a completed change message to said BTS by the mobile station; and (v) completing the handoff.

2. The method as set forth in claim 1, wherein if said first and second reports are not identical, then return to step (i).

3. In a code division multiple access cellular mobile communication system, said system including a plurality of mobile stations which receive mobile communication services and manage active sets consisting of received identification signals identifying service areas, a plurality of BTSs (Base Transceiver Stations) for providing the mobile stations moving between a plurality of service areas with said mobile communication services, a BSC (Base Station Controller) connecting said plurality of BTSs with an MSC (Mobile Switching Center) and for providing the mobile stations with a handoff, a soft handoff method for completing a soft handoff when said soft handoff fails because the BTS does not receive an acknowledgement signal comprising the steps of:

(i) reporting by the mobile station said change of the pilot signal of each cell for which it is receiving a pilot signal to the BSC;

(ii) determining by the BSC based on said report whether the soft handoff is to be performed and which kind of handoff is to be performed;

(iii) if handoff is to be performed according to said determination step, ordering channel by BSC to transmit a new sector of a new cell according to said determined handoff;

(iv) ordering the mobile stations to change the active set via a BTS command according to said transmitting order;

(v) if the mobile stations report the completion of said active set change to the BSC in a predetermined time, the BTS terminates handoff, otherwise the BSC orders the mobile stations to report the change of the pilot signal of each cell again;

(vi) reporting to the BSC by the mobile stations said change of pilot signal of each cell;

(vii) checking whether said change is identical with those of a previously received pilot signal;

(viii) if said change is not identical, determining by the BSC whether a handoff is to be performed and which kind of handoff is to be performed and ordering the release of resources which were used to transmit according to the previous handoff and transmitting the newly allocated resources;

(ix) if the same or said transmitting order exists, ordering the mobile stations by BTS to change the active set; and (x) reporting BTS by the mobile stations the completion of said change.

* * * * *